Patented Nov. 18, 1952

2,618,633

UNITED STATES PATENT OFFICE 2,618,633

PREPARATION OF CARBOXYETHYL CELLULOSE

Charles L. P. Vaughan, Wilmington, Del., assignor to Hercules Powder Company, Wilmington, Del., a corporation of Delaware No Drawing. Application December 23, 1949, Serial No. 134,851

4 Claims. (Cl. 260—231)

This invention relates to the preparation of carboxyethyl ethers of polysaccharides and, more particularly, to the process of preparing water- and alkali-soluble carboxyethyl ethers of cellulose by the reaction of acrylamide with cellulose.

It is well known that the introduction of a carboxyalkyl group into cellulose results in the production of a cellulose derivative having many advantageous properties. Such derivatives which are water and alkali soluble have many commercial applications. Various attempts have been made to prepare carboxyethyl cellulose, one of the most successful methods being the reaction of an alkali cellulose with $\beta$-chloro- or $\beta$-bromo-propionic acid. However, this process is not economically feasible on a commercial scale. In the first place, hydrogen halide is formed as a by-product, and this represents a considerable mass loss in the overall process. Furthermore, the halo-propionic acids used as starting materials are not only expensive, but they are not readily available for commercial operations. In all of the prior art processes, the carboxyethyl cellulose has been produced in a "dough" or solution process which makes the isolation of the product difficult.

Now in accordance with this invention it has been found that carboxyethyl ethers of polysaccharides, as, for example, carboxyethyl cellulose, may be prepared by reacting a suspension of an alkali polysaccharide in an inert solvent with acrylamide. The reaction to produce the carboxyethyl derivative takes place in one step, the amide group hydrolyzing to the carboxylic group under the conditions used in carrying out the reaction. Thus this new method has the advantages of utilizing readily available raw materials, the process is carried out in one step, and being a fibrous process, the product is readily isolated.

The following examples will illustrate the preparation of carboxyethyl polysaccharides in accordance with this invention. All parts and percentages are by weight unless otherwise indicated.

Example 1

Four parts of chemical cotton ground to over 40 mesh were suspended in 100 parts of dioxane and 15 parts of a 40% aqueous sodium hydroxide solution which was equivalent to 6 moles per anhydroglucose unit were added and the mixture was agitated at 70° C. for ½ hour. Seven parts of acrylamide (4 moles per anhydroglucose unit) were then added and the reaction was allowed to continue at 70° C. for 3 hours. The fibrous product was separated by filtration, washed repeatedly with 80% methanol, and then with anhydrous methanol and finally was dried in vacuo at 60° C. The carboxyethyl cellulose so obtained was analyzed and found to contain 0.52 carboxyethyl groups per anhydroglucose unit. It was soluble in dilute alkali and water, giving clear, viscous solutions in each case.

Example 2

Four parts of purified cotton linters ground to over 40 mesh were pretreated with 30 parts of 20% aqueous sodium hydroxide solution. The crumbs of alkali cellulose so formed were suspended in 100 parts of dioxane, agitated at 70° C. for ½ hour, and 7 parts of acrylamide (4 moles per anhydroglucose unit) were added and the agitation was continued for 3 hours at 70° C. The product was separated by filtration, washed with 80% methanol, and then anhydrous methanol and finally dried. On analysis it was found to contain 0.46 carboxyethyl groups per anhydroglucose unit. It was soluble in water and dilute alkali, giving clear, viscous solutions in each case.

Example 3

Five parts of wood pulp ground to 20 mesh were suspended in 80 parts of tertiary butyl alcohol. To this suspension was added 16.5 parts of a 30% aqueous sodium hydroxide solution (4 moles per anhydroglucose unit) and the mixture was agitated for ½ hour at 70° C. Acrylamide (4.4 parts, which was equivalent to 2 moles per anhydroglucose unit) was then added and the reaction mixture agitated for 2 hours at 70° C. The fibrous product was separated by filtration, washed with 80% methanol, then with anhydrous methanol and finally was dried in vacuo at 60° C. The carboxyethyl cellulose so obtained had a degree of substitution of 0.42. The white fibrous product was soluble in water and dilute alkali, giving clear, viscous solutions in each case.

Example 4

Five parts of chemical cotton ground to 40 mesh were suspended in 80 parts of tertiary butyl alcohol and 12 parts of a 40% aqueous sodium hydroxide solution were added. After agitating the mixture for one hour at room temperature, it was heated to 80° C. and 3.3 parts of acrylamide (1.5 moles per anhydroglucose unit) were added. The reaction was allowed to continue for 2½ hours at this temperature with constant agitation. The product was isolated as in the foregoing examples. The white fibrous material had a degree of substitution of 0.37 and was soluble in water and alkali, giving clear, viscous solutions in each case.

*Example 5*

Five parts of cotton linters ground to 40 mesh were suspended in 90 parts of benzene. To this suspension was added 12 parts of a 40% aqueous sodium hydroxide solution (4 moles per anhydroglucose unit) and the mixture was agitated for ½ hour at 70° C. Acrylamide (4.4 parts, which was equal to 2 moles per anhydroglucose unit) was added and the reaction mixture was agitated at 70° C. for 2 hours. The fibrous carboxyethyl cellulose was isolated as in the foregoing examples. The product had a degree of substitution of 0.35 and dissolved in water and alkali to give viscous solutions in each case.

In accordance with this invention carboxyethyl ethers of polysaccharides may be prepared by the addition of acrylamide to the polysaccharide in an organic solvent medium in the presence of an alkaline reagent. This carboxyethylation reaction will proceed readily with any polysaccharide such as cellulose, or partially substituted celluloses, starch, cellodextrins, pectic substances, etc., and will impart water and alkali solubility to polysaccharides which, prior to carboxyethylation, do not possess these solubility characteristics.

Since the reaction takes place between a hydroxyl radical of the polysaccharide and the double bond of the acrylamide, it might be expected that the product obtained by carrying out the reaction in accordance with this invention would be a carbamylethyl ether of the cellulose or other polysaccharide. However, as may be seen from the foregoing examples, this is not the case for the amide groups are hydrolyzed to the carboxyl group and the product obtained is the carboxyethyl ether of the polysaccharide in the form of its salts. The reaction, using cellulose as a typical polysaccharide, may be represented as follows:

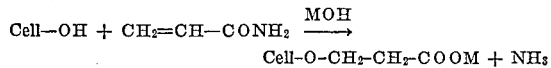

Cell—OH + CH$_2$=CH—CONH$_2$ $\xrightarrow{\text{MOH}}$ Cell-O-CH$_2$-CH$_2$-COOM + NH$_3$ where Cell-OH represents an etherifiable hydroxyl group of cellulose and MOH is a strongly alkaline hydroxide. Thus it may be seen that the ethylenic addition and hydrolysis of the amide group appear to take place simultaneously. Whether these two reactions actually occur simultaneously or whether they take place as two separate but rapidly succeeding reactions is not known. In any event the product is the alkali salt of the carboxyethyl ether which may contain extremely small amounts of residual nitrogen indicating the presence of only a small amount of unhydrolyzed amide groups.

The reaction between the polysaccharide as, for example, cellulose and the acrylamide takes place in the presence of an alkaline reagent. Any strongly alkaline hydroxide as, for example, the alkali metal hydroxides such as sodium hydroxide, potassium hydroxide, etc. may be used. The alkaline reagent is believed to serve two purposes in this carboxyethylation reaction; to swell and disperse the cellulose or other polysaccharide, thus activating it, and to catalyze the acrylamide addition.

Any mode of introducing the alkaline reagent into the reaction mixture may be utilized. The cellulose or polysaccharide may be converted to an alkali cellulose or polysaccharide by suspending it in an organic solvent and then treating the suspension with an aqueous solution of from 20 to 50% concentration of the alkaline reagent. In this alkali cellulose preparation, the amount of alkaline reagent which is added is adjusted to approximately 3 to 6 moles per anhydroglucose unit, although the reaction proceeds favorably with higher proportions of alkali, or with lesser amounts provided that proportionately lesser amounts of acrylamide are used in the subsequent etherification reaction. To complete the alkali cellulose formation, the mixture of cellulose, or other polysaccharide, organic solvent, and alkaline reagent may then be agitated and heated for 0.5 to 1 hour at room temperature or any suitable temperature up to about 100° C., depending upon the boiling point of the solvent. An alternative method of alkali-polysaccharide formation consists of pretreating the polysaccharide with an aqueous alkaline reagent and then suspending the crumbs so formed in an organic solvent before the acrylamide reaction. Substantially the same results are obtained by either procedure.

By alkali cellulose or other polysaccharide as used in this specification and appended claims is meant the alkali metal salts of the polysaccharide.

As already pointed out above, the reaction between the alkali cellulose or other polysaccharide, and acrylamide is carried out in the presence of an organic solvent. Any inert organic solvent; i. e., any organic solvent having no tendency to react with the acrylamide, may be used as the medium for this carboxyethylation reaction. The main functions of the organic solvent are to serve as a heat transfer medium, and as a dispersing or insolubilizing agent so that the hydrophilic derivative will remain in a fibrous state. Suitable organic solvents which may be used for the reaction are dioxane, isopropanol, tertiary butanol, tetrahydrofuran, ethylene glycol diethyl ether, etc. Best results are obtained with organic solvents that dissolve water such as dioxane, tertiary butanol, etc. In these media water cannot accumulate in the cellulose derivative phase of the mixture. However, this carboxyethylation reaction may be carried out satisfactorily in such water-insoluble organic solvents as benzene, toluene, etc. The polysaccharide may be suspended in the solvent before the treatment with the alkaline reagent, or the alkali polysaccharide may be prepared and then suspended in the solvent. The amount of solvent used is determined by the type of agitation available for the heterogeneous reaction, since mixing becomes increasingly difficult with increasing cellulose proportions, and also depends upon the form of cellulose used; i. e., the state of subdivision. In general, with ground purified cotton linters, a cellulose to solvent ratio of about 1:9 to about 1:25 is used and with unground linters, a ratio of about 1:25 to about 1:50 is used.

The reaction in accordance with this invention is usually carried out at a temperature above about 50° C., preferably at a temperature from about 50° C. to about 140° C. and more preferably at a temperature of from about 70° C. to about 95° C. If the particular solvent being used as the medium for the reaction possesses a boiling point below this temperature range, the reaction may be carried out under pressure. The temperature of the suspension of alkali cellulose in organic solvent is preferably adjusted to the reaction temperature prior to the addition of the acrylamide. Following this addition, the reaction is allowed to proceed at the specified temperature for from about 1 to about 4 hours and preferably from 1 to 2 hours. Longer reaction times may be used but it is believed that no advantages are realized and, in fact, above about 16 hours' reaction time, depolymerization of the cellulose and de-etherification are noticeable.

The amount of acrylamide to be added to the polysaccharide material is dependent upon the degree of etherification desired in the final product. Usually, about 0.5 to about 4 moles of acrylamide per anhydroglucose unit are added. Larger amounts may be used, if desired, but lesser amounts generally do not produce ethers of the desired degree of water or alkali solubility. The acrylamide may be added as a solid or as a solution in water or in an inert organic diluent such as those used for carrying out the reaction. The acrylamide may also be used in the form of its salts such as the sulfate, but the free acrylamide is preferred since a more uniform product is usually obtained with it.

The carboxyethyl ether of the polysaccharide, in the form of its alkali salt, may readily be isolated from the reaction mixture by filtration, centrifugation, etc., since it is in the same physical state as the original polysaccharide and is insoluble in the organic solvent medium. For example, when fibrous cellulose is converted to its carboxyethyl ether by the reaction in accordance with this invention, the product will likewise be fibrous. The carboxyethyl ether is thus not only in a very desirable form but being in this form is very easily purified by a simple washing procedure. In fact, if desired, the reaction mixture may be diluted, before separation, with the washing liquid. The solvent used for this washing operation should be one which will readily dissolve any unreacted acrylamide and the by-products of the reaction such as sodium acrylate formed by the hydrolysis of unreacted acrylamide, ammonia, and the alkaline reagent, but which solvent will not dissolve the carboxyethyl cellulose. A convenient solvent for this purpose is methanol. Since methanol itself will dissolve an alkali hydroxide but not an alkali acrylate, a methanol-water mixture, such as a 70 to 80% methanol, is preferable for the preliminary washing step. However, other solvents are equally operable. Anhydrous methanol may be used for the final wash in order to dehydrate the fibers. The carboxyethyl ether may then be dried in the form of its alkali salt, or, should the free acid form be desired, it may be acidified and isolated.

The carboxyethyl ethers of polysaccharides prepared in accordance with this invention have widespread applications. For example, carboxyethyl cellulose prepared as described herein may be used as a thickening agent in textile printing pastes, latex dispersions, etc., in oil well drilling muds, in special purpose adhesives and coatings, and in many other applications.

What I claim and desire to protect by Letters Patent is:

1. The process of preparing a carboxyethyl ether of cellulose, said ether being characterized by its ability to yield clear solutions when dissolved in water, which comprises reacting a suspension of an alkali cellulose in an inert organic solvent with acrylamide in the presence of a strongly alkaline hydroxide.

2. The process of preparing a carboxyethyl ether of cellulose, said ether being characterized by its ability to yield clear solutions when dissolved in water, which comprises reacting the cellulose with an aqueous solution of an alkali metal hydroxide and then reacting a suspension of the alkali cellulose so obtained in an inert organic solvent with acrylamide.

3. The process of preparing a carboxyethyl ether of cellulose, said ether being characterized by its ability to yield clear solutions when dissolved in water, which comprises reacting a suspension of alkali cellulose in an inert organic solvent with from about 0.5 to about 4 moles of acrylamide per anhydroglucose unit at a temperature of about 50° C. to about 140° C. in the presence of a strongly alkaline hydroxide.

4. The process of preparing a carboxyethyl ether of cellulose, said ether being characterized by its ability to yield clear solutions when dissolved in water, which comprises reacting a suspension of alkali cellulose in an inert organic solvent with from about 0.5 to about 4 moles of acrylamide per anhydroglucose unit at a temperature of about 70° C. to about 95° C. in the presence of a strongly alkaline hydroxide.

CHARLES L. P. VAUGHAN.

REFERENCES CITED

The following references are of record in the file of this patent:

UNITED STATES PATENTS

| Number    | Name             | Date          |
|-----------|------------------|---------------|
| 2,338,681 | Bock et al.      | Jan. 4, 1944  |
| 2,362,900 | Groombridge et al.| Nov. 14, 1944 |
| 2,398,767 | Burke            | Apr. 23, 1946 |
| 2,512,338 | Klug             | June 20, 1950 |
| 2,517,577 | Klug et al.      | Aug. 8, 1950  |
| 2,539,417 | Grassie          | Jan. 30, 1951 |